(12) United States Patent
Shafer

(10) Patent No.: US 7,609,163 B2
(45) Date of Patent: Oct. 27, 2009

(54) RADIO FREQUENCY ID DOPPLER MOTION DETECTOR

(75) Inventor: Gary Mark Shafer, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 275 days.

(21) Appl. No.: 11/514,581

(22) Filed: Sep. 1, 2006

(65) Prior Publication Data
US 2008/0061976 A1  Mar. 13, 2008

(51) Int. Cl.
G08B 13/14 (2006.01)
H04Q 5/22 (2006.01)
G08B 13/18 (2006.01)

(52) U.S. Cl. ............ 340/572.1; 340/10.3; 340/554

(58) Field of Classification Search ..... 340/10.1–10.34, 340/571, 572.1–572.9, 554, 539.13, 539.21–539.26
See application file for complete search history.

(56) References Cited

U.S. PATENT DOCUMENTS

| 4,274,083 | A | | 6/1981 | Tomoeda |
| 4,595,915 | A | * | 6/1986 | Close ................ 340/572.2 |
| 6,046,683 | A | * | 4/2000 | Pidwerbetsky et al. ..... 340/10.4 |
| 6,084,530 | A | | 7/2000 | Pidwerbetsky et al. |
| 6,888,459 | B2 | * | 5/2005 | Stilp .................... 340/541 |
| 7,193,504 | B2 | * | 3/2007 | Carrender et al. .......... 340/10.4 |
| 2004/0160306 | A1 | | 8/2004 | Stilp |
| 2006/0197652 | A1 | * | 9/2006 | Hild et al. ................. 340/10.2 |

FOREIGN PATENT DOCUMENTS

| EP | 0853245 A2 | 7/1998 |
| WO | 02/073234 A1 | 9/2002 |
| WO | 03/032240 A2 | 4/2003 |

* cited by examiner

Primary Examiner—Jennifer Mehmood
(74) Attorney, Agent, or Firm—Christopher & Weisberg, P.A.

(57) ABSTRACT

A system and method for a radio frequency identification (RFID) reader for use in an RFID detection system. The reader has an RF source for generating RF signals. An antenna is coupled to the RF source. The antenna transmits interrogation RF signals to one or more RFID markers within an interrogation zone and receives communication signals from one or more items within the interrogation zone. The communication signals include Doppler signals indicating movement of an item within the interrogation zone. A receiver receives the communication signals and motion detection circuitry detects the Doppler signals.

17 Claims, 4 Drawing Sheets

RADIO FREQUENCY ID DOPPLER MOTION DETECTOR

CROSS-REFERENCE TO RELATED APPLICATIONS n/a

STATEMENT REGARDING FEDERALLY SPONSORED RESEARCH OR DEVELOPMENT n/a

BACKGROUND OF THE INVENTION

1. Statement of the Technical Field

The present invention relates to radio frequency identification ("RFID") devices and more particularly to a system and method for monitoring the relative directional movement and speed of an article within an RFID interrogation zone by use of Doppler detection circuitry incorporated within an RFID surveillance system.

2. Description of the Related Art

Radio frequency identification (RFID) is a term used to describe technologies that use radio waves to automatically identify objects or people. RFID systems may be used for a number of applications such as managing inventory, electronic access control, security systems, automatic identification of cars on toll roads, and electronic article surveillance ("EAS"). This may be done in several ways, the most popular involves storing a serial number that identifies an object or a person, and perhaps other information, on a microchip in communication with a transponder, commonly referred to as an RFID marker or RFID tag. RFID systems may be used to track or monitor the location and/or status of articles or items to which an RFID marker is applied. An antenna, sometimes packaged with a transceiver and decoder, enables the marker to transmit the identification information to the transceiver, which includes the ability to receive and convert the radio waves reflected back from the RFID marker into digital information that can then be passed on to computers for processing. The transmitting antenna, the transceiver and the decoder are often collectively referred to as the RFID reader.

The RFID reader, which can be either a handheld or a fixed-mount device, emits radio waves in ranges of anywhere from one inch to 100 feet or more, depending upon its power output and the radio frequency used. When an RFID marker passes within the antenna's electromagnetic zone, it detects the reader's activation signal. The reader then decodes the data encoded in the tag's integrated circuit and the data is passed to a computer for processing.

While RFID systems provide fast and accurate identification of items to which are applied RFID markers, present RFID systems fail to track the movement and speed of movement of items within the antenna's electromagnetic zone. Thus, when an RFID reader receives item identification information from an interrogated marker it ignores other signals, e.g., Doppler signals, that would indicate the relative motion, direction of motion, and speed of an item. This is due to the fact that the RFID readers either do not include the necessary hardware or logic to detect movement or simply filter out or ignore Doppler signals. Separate Doppler signal detectors often need to be incorporated into the RFID system resulting in an increase of cost, labor and design. Passive Infrared ("PIR") detectors are often used to detect motion. However, the incorporation of PIR detectors into an existing RFID system requires additional hardware and additional start up costs, resulting in a system that is often impractical.

Therefore, what is needed is a method and system that utilizes existing RFID hardware to detect incoming Doppler signals from an item within the RFID interrogation zone and determines the relative speed and motion of the item.

SUMMARY OF THE INVENTION

The present invention addresses the deficiencies in the art with respect to RFID readers and RFID systems. An RFID system includes an RFID reader in communication with one or more RFID markers. Each RFID marker can be applied to an item of interest. Each marker can be activated upon receipt of a start-up power signal from the RFID reader. Each marker includes an antenna that can transmit information back to the RFID reader, the information typically relating to the item being interrogated. The RFID reader also includes the necessary circuitry to detect signals relating to the relative movement of any item within an interrogation zone, and to forward these movement signals to a computer, where they can be processed to determine the relative movement, direction and speed of the item in motion, with respect to the RFID reader. Alternately, a Doppler detector can be inserted between the RFID reader and the interrogation zone to detect the return signal from the item. The Doppler detector can then extract and forward the Doppler signals to a computer for processing.

According to one aspect, a radio frequency identification ("RFID") reader for use in an RFID detection system is provided. The reader includes an RF source for generating RF signals and an antenna coupled to the RF source. The antenna transmits interrogation RF signals to one or more RFID markers within an interrogation zone and receives communication signals from one or more items within the interrogation zone, wherein the communication signals include Doppler signals indicating movement of the an item within the interrogation zone. The reader further includes a receiver for receiving the communication signals, and motion detection circuitry for detecting the Doppler signals.

According to another aspect, the present invention provides an RFID detection system. The system includes one or more RFID markers, an RFID reader, and motion detection circuitry for detecting Doppler signals. The RFID reader includes an RF source for generating RF signals, an antenna coupled to the RF source, and a receiver for receiving communication signals. The antenna transmits interrogation signals to the one or more RFID markers within an interrogation zone and receives communication signals from an item within the interrogation zone. The communication signals include Doppler signals indicating movement of the item within the interrogation zone.

According to still another aspect, the invention provides a method of operating an RFID marker reader in which an interrogation signal is transmitted at a first power level to detect movement of an item within the interrogation zone. The interrogation signal is transmitted at a second power level greater than the first power level to detect the presence of a marker if movement of an item is detected within the interrogation zone.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 1:
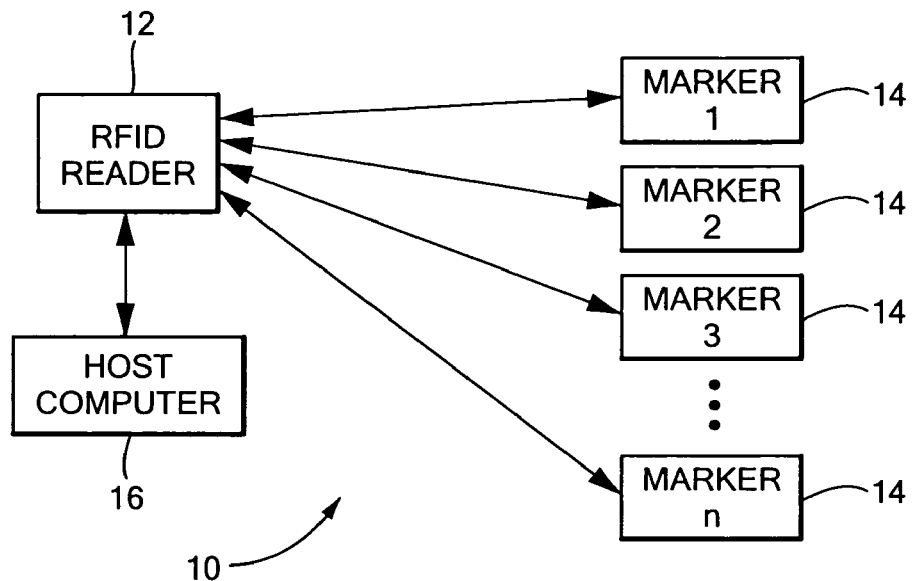
FIG. 1 is a diagram of an RFID system constructed in accordance with the principles of the present invention.

The present invention advantageously provides a system and method that allows an RFID system to utilize its existing components to detect the movement of an item within a given interrogation zone, by detecting Doppler signals generated due to the movement of the item, and processing the Doppler signals to determine if the item within the interrogation zone is moving, as well as determining the speed and direction of movement, with respect to the RFID reader. Referring now to the drawing figures in which like reference designators refer to like elements there is shown in FIG. 1 a system constructed in accordance with the principles of the present invention and designated generally as "10." System 10 is an RFID interrogation system and includes an RFID reader 12, one or more RFID markers 14 and a host computer 16.

RFID reader 12 (discussed in greater detail below) typically includes a transceiver, a decoder and an antenna, and may be a handheld device or a fixed-mount device. Reader 12 communicates with each marker 14 by transmitting, via an antenna, radio signals to one or more markers 14. Signals are transmitted to a marker 14 (the "down link") in order to obtain identification information from that marker 14. The antenna is used to transmit signals to and from markers 14. Antennas may be part of the reader 12 or may be separately mounted within, for example, a door frame or a pedestal.

The marker 14 being interrogated returns identification information to reader 12 by transmitting RF signals (via a "back link") to the reader's antenna. The received signals are then processed via a digital signal processor within reader 12, or via a host computer 16. RFID markers 14 come in wide varieties of shapes and sizes. Markers 14 can be either active or passive. Active markers are powered by an internal battery and the data received by these types of markers can be modified or written over. The memory size of an active marker varies according to the application requirements. Passive markers operate without an external power source and obtain their operating power from a signal transmitted from the reader. Thus, passive markers 14 are typically much lighter and less expensive than active markers. However, passive markers typically have a shorter read range when compared to active markers, and require a high-powered reader to activate them.

Figure 2:
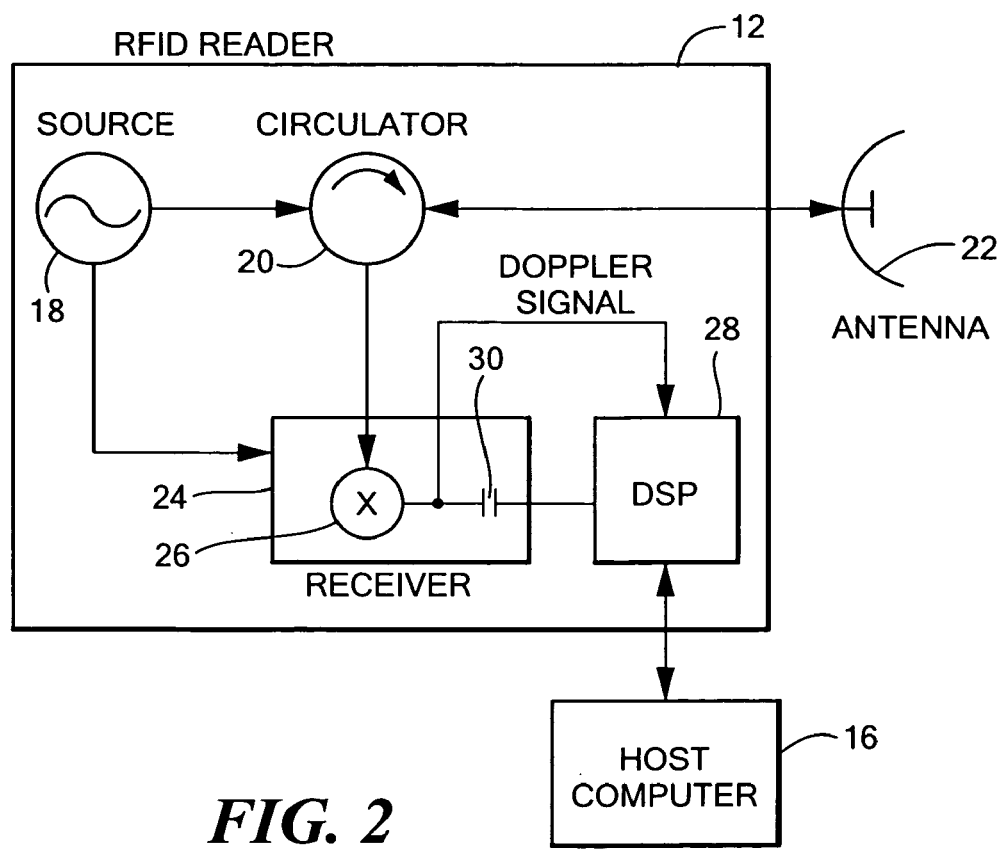
FIG. 2 is a diagram of an RFID reader incorporating the present invention.

FIG. 2 is an illustration of a typical RFID reader 12 used in connection with the present invention. It should be noted that the reader 12 illustrated in FIG. 2 is an exemplary reader 12 that is used in a typical RFID interrogation system and the invention disclosed herein is not limited to a particular design or type of RFID reader. Reader 12 includes an RF source 18, which supplies the radio signal. Circulator 20 is of the type commonly known in the art, and assists in directing the RF signal to and from antenna 22. Antenna 22 transmits radio signals to one or more markers 14. Antenna 22 may be configured as a transceiver antenna with an associated controller that provides control and switching to switch from transmitting to receiving functions at predetermined time intervals. Those skilled in the art will recognize that there may be separate transmitting and receiving modules within antenna 22.

Antenna 22 emits electromagnetic signals over an electromagnetic field, or interrogation zone. The electromagnetic field produced by antenna 22 can be constantly present in instances where multiple markers 14 are present. If constant interrogation is not needed, the electromagnetic field can be activated intermittently. The electromagnetic field established by antenna 22 will cause a response from the interrogated marker 14. This response, in the form of a radio signal, is received by the receiving module 24 or the transceiver module of antenna 22.

The signal received from the interrogated marker 14 typically contains information about the identity of the interrogated marker 14 and the item that is associated with it. The incoming signal is received, via antenna 22, by receiver 24, where a digital signal processor ("DSP") 28 processes the signal or transmits the signal to a host computer 16 for processing. In certain instances, it may be desirable to not only learn the identity of the interrogated marker 14, and the identity and characteristics of the item to which the marker 14 is affixed, but also whether an item within the interrogation zone has moved, relative to reader 12.

One or more markers 14 within the interrogation zone created by the transmission of radio signals from reader 12 respond to the reader 12 with radio signals that are received by the reader's antenna 22. The present invention further provides a means to track the movement of any items within the RFID reader's interrogation zone via the use of RFID system hardware without the need for additional hardware. This is done without regard to whether a marker 14 is affixed to the item and is accomplished by including Doppler signal detection circuitry as part of the RFID reader 12. When each interrogated marker 14 responds to an interrogation signal, it transmits an identification signal, which typically includes the identity of the item to which the marker 14 is affixed.

When an item with or without a marker 14 moves within the interrogation zone, it also responds by returning signals to antenna 22. These signals are in the form of Doppler signals, indicating the relative movement of the moving item with respect to RFID reader 12. Thus, although the actual frequency and/or wavelength of the moving item's response signal is not changing, the movement of the item provides an apparent change in frequency and/or wavelength that, if detected, can provide information about the movement of the item with respect to a stationary source, i.e., reader 12.

Referring once again to FIG. 2, reader 12 is provided with circuitry to enable it to detect Doppler signals from the incoming baseband signals, and to separate the Doppler signals for processing. Specifically, signals arriving at receiver 24 may be sent to mixer 26, where, if necessary, the frequency of the incoming RF signal is converted to a different frequency. Doppler signals indicating movement of an item are filtered from the incoming signal, and the resulting signal containing only Doppler signals are processed separately via a digital signal processor ("DSP") 28. The remainder of the incoming signal passes through to DSP 28 via, for example, a capacitor 30 within receiver 24, where it is processed separately.

The redirected Doppler signals can be further analyzed by host computer 16. These signals filtered from the incoming signal may be further analyzed to determine the relative direction and speed that the item is moving. It should be noted that other than the inclusion of Doppler signal detection circuitry in RFID reader 12, no other additional hardware is necessary to detect and monitor the movement of an item within the RFID interrogation zone. In this fashion, RFID reader 12, in addition to its normal marker interrogation functions, acts as a motion sensor and is able to determine, for example, that products within an interrogation zone have been moved from an initial location to another location, such as a storage area.

In a typical scenario utilizing RFID system 10, reader 12 transmits activation signals to one or more markers 14. As discussed above, when passive markers are being used, these markers require activation power from reader 12. Reader 12 transmits amplitude shift keyed ("ASK") commands to one or more markers 14 in order to activate them. Each marker 14 is associated with a particular item of interest. Rather than utilizing RFID system 10 solely for item identification purposes, system 10 utilizes the RFID system, i.e., a reader, one or more markers, antennas to transmit and receive signals, decoders to decode date arriving on the incoming signal, and associated hardware, to detect the relative movement of any item within the interrogation zone.

Figure 3:
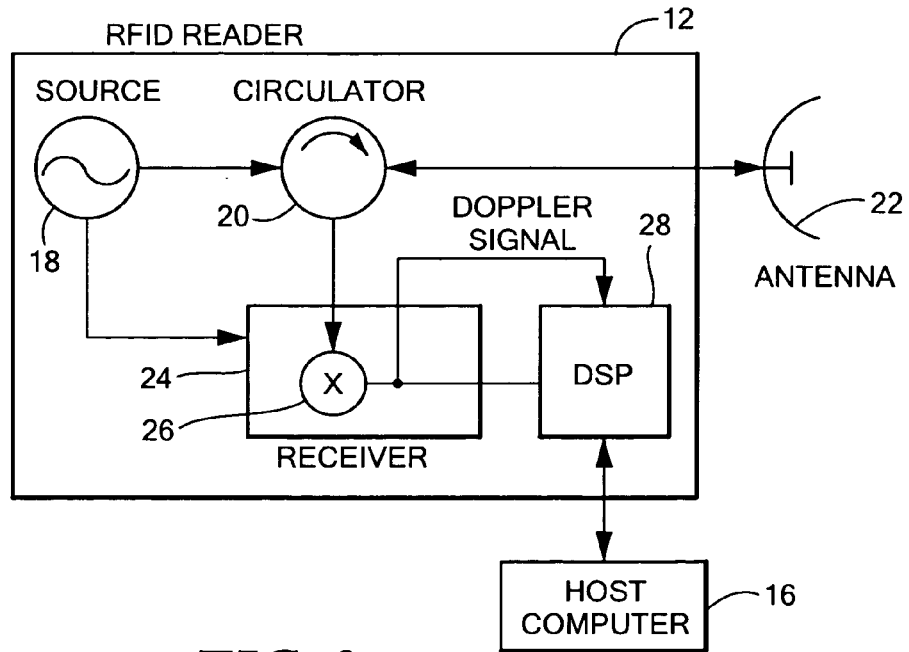
FIG. 3 is a diagram of an alternate embodiment of the RFID reader incorporating the present invention.

FIG. 3 illustrates an alternate design of the RFID reader 12 of the present invention. In this example, the incoming signal is directed to DSP 28 without the Doppler signals being filtered out. In this scenario, rather than including hardware to extract the Doppler signals from the baseband signal, DSP 28 includes the necessary logic to detect, extract and process the Doppler signals.

Figure 4:
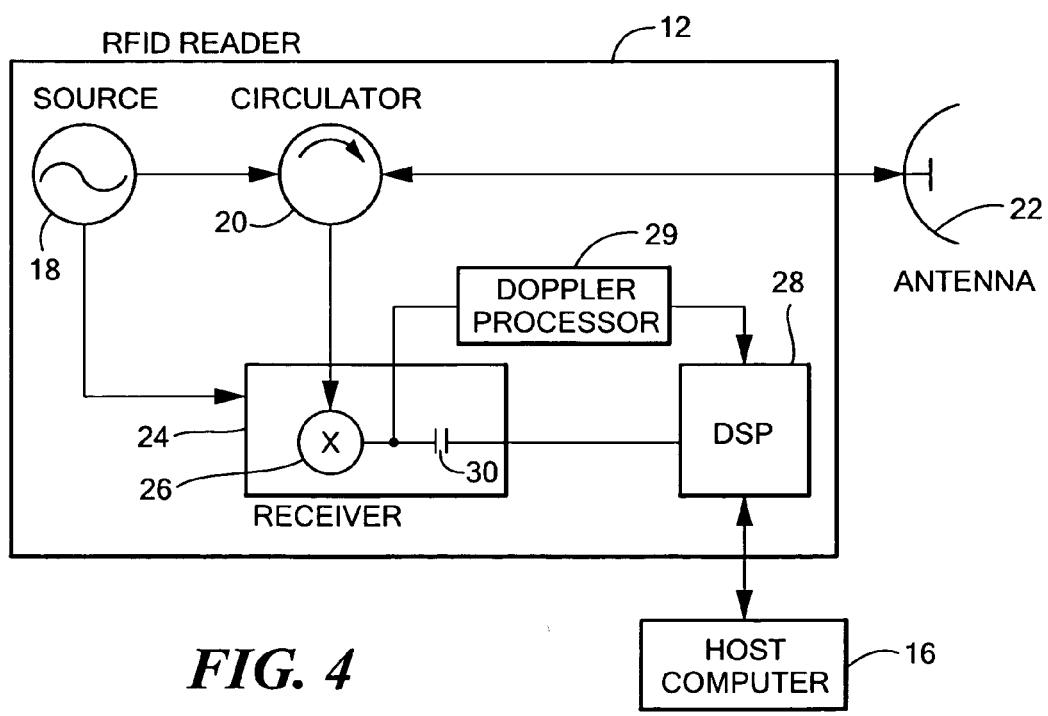
FIG. 4 is a diagram of yet another embodiment of the RFID reader incorporating the present invention.

Another example of an alternate design of RFID reader 12 is illustrated in FIG. 4. Here, an additional DSP 29 is included within reader 12. DSP 29 processes the Doppler signal separately, while DSP 28 processes the baseband signal after the Doppler signal has been filtered. The present invention is not limited to a particular method of extracting and processing the Doppler signal from the incoming baseband signal. The present invention incorporates the necessary hardware and/or logic within the RFID reader 12 in order to detect Doppler signals from the signal arriving at antenna 22, which indicate movement, or the absence of movement, of items within the reader's interrogation zone.

Figure 5:
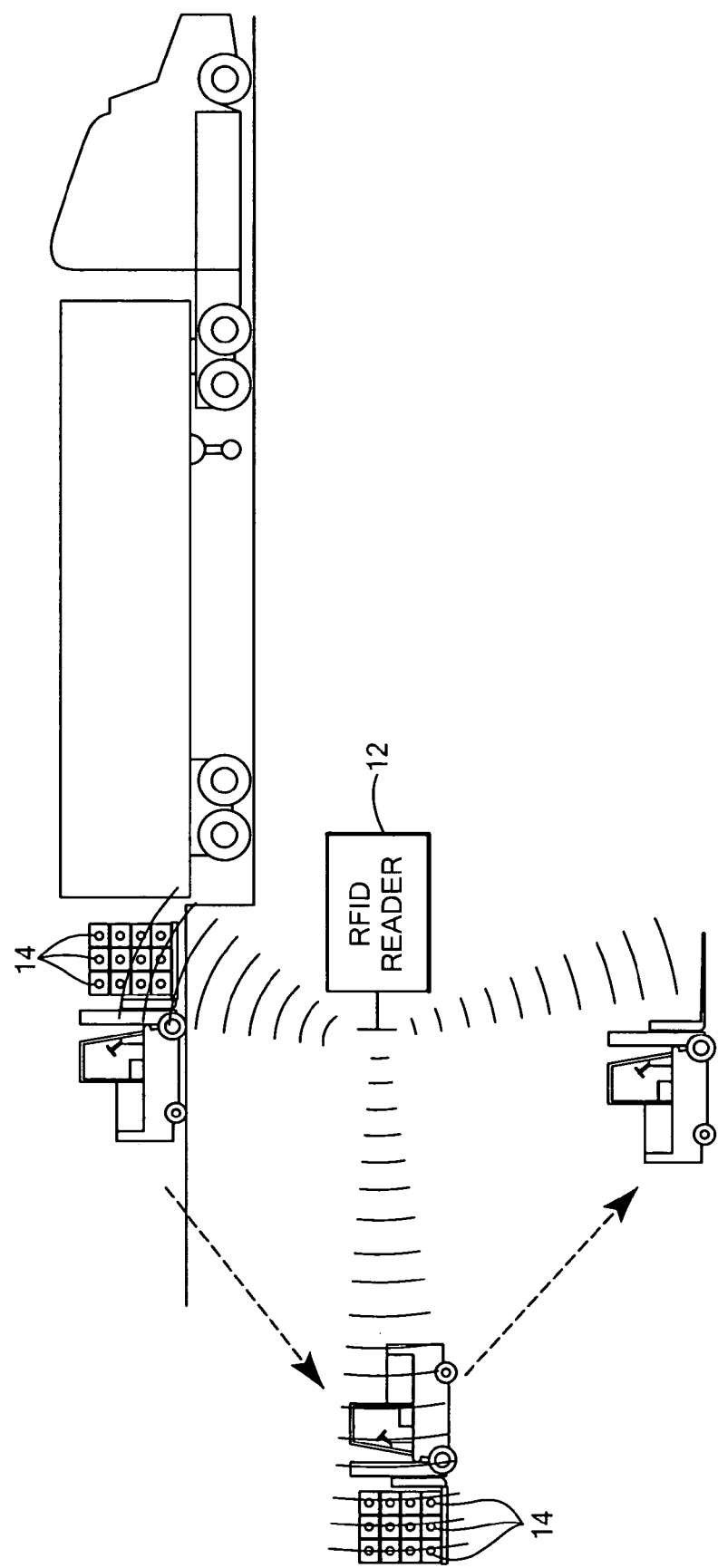
FIG. 5 is a diagram of an RFID system incorporating the present invention and illustrating one application of the present invention.

One example of an application of an RFID system 10 incorporating the present invention is the situation where boxes containing products are being unloaded at a loading dock, as shown in FIG. 5. In this example, it may be desirable simply to detect the movement, such as of a box, forklift and the like (collectively an "item") within the detection zone initially without regard to whether the item has a marker 14 affixed thereto or even whether the forklift is moving any boxes. Once an item is detected, reader 12 can ascertain whether a marker 14 is present and gather more details about the marked item.

In this arrangement, reader 12 can be programmed to initially operate in a low power mode and remain in the low power mode when no items are detected as moving within the interrogation zone. While in low power mode, reader 12 has enough power to detect incoming Doppler signals, but does not need to increase its power to energize markers 14 for interrogation. When the forklift is filled with items or is merely moving, motion detection circuitry in reader 12 detects the movement and ramps up its power to activate and detect whether there are markers 14 present by transmitting interrogation signals.

The motion detection circuitry, which may include such hardware as a directional coupler, detects the presence of items within the interrogation zone that may be in motion. Thus, the RFID reader 12, by determining the movement of items within the zone via its Doppler signal detection circuitry, can conserve its power when no movement is detected within the interrogation zone. Advantageously, by reducing power when no markers 14 are present, interference with other readers 12 is reduced. This is particularly relevant in dense reader environments.

Thus, because reader 12 is primarily being used to monitor the movement of items rather than only to obtain item identification information from the markers 14, when there is no marker movement, reader 12 can set its operational power to low, and only ramp its power to a higher operating level when an item enters the interrogation zone.

Figure 6:
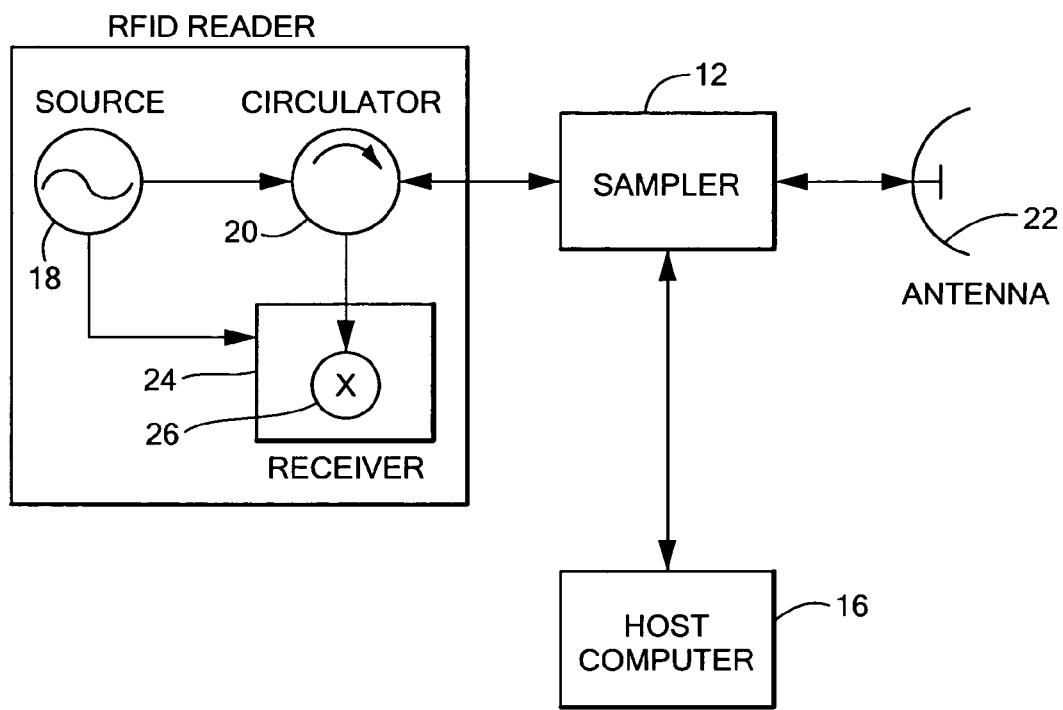
FIG. 6 is a diagram illustrating still another embodiment of the present invention.

In an alternate embodiment of the invention, rather than the motion detection circuitry being located within reader 12, the motion detection circuitry is located between reader 12 and antenna 22. FIG. 6 illustrates an exemplary embodiment of the present invention. In FIG. 6, sampler 12 analyzes both the forward and reflected signals from antenna 22 in order to determine the presence of Doppler signals. Sampler 12 contains the necessary circuitry and/or logic for detecting incoming RF signals arriving from an item within the interrogation zone at antenna 22, determines if the incoming signal contains signals indicating that one or more items are in motion, and transmits these signals to host computer 16 or DSP 28, for further processing. In this embodiment, reader 12 need not include any motion detection circuitry but instead, is in communication with sampler 12, which performs the motion detection external to reader 12, but within system 10.

The present invention therefore advantageously provides a system and method for detecting the movement of items in a RFID surveillance system. The system can use components that already exist in the RFID system, and further provides motion detection circuitry, either in the RFID reader itself or elsewhere in the system. The motion detection circuitry detects and filters out motion (e.g., Doppler) signals, and forwards these signals to a processor that processes the signals in order to determine whether items within the RFID reader's zone of interrogation have moved, how fast these items have moved and in what direction they have moved.

The RFID system incorporating the present invention is used primarily to interrogate markers 14. However, the RFID reader 12 need not be powered to its full capacity unless one or items are detected as moving within the interrogation zone. When it is determined that there are no markers 14 within the interrogation zone, the RFID reader 12 can conserve its overall power and reduce interference since it does not need to energize any markers 14, while maintaining sufficient power to operate the motion detector. As soon as one or more items enter the interrogation zone, RFID reader 12 can attempt to energize markers 14, while maintaining its motion detection capability.

The present invention can be realized in hardware, software, or a combination of hardware and software. An implementation of the method and system of the present invention can be realized in a centralized fashion in one computer system or in a distributed fashion where different elements are spread across several interconnected computer systems. Any kind of computer system, or other apparatus adapted for carrying out the methods described herein, is suited to perform the functions described herein.

Significantly, this invention can be embodied in other specific forms without departing from the spirit or essential attributes thereof, and accordingly, reference should be had to the following claims, rather than to the foregoing specification, as indicating the scope of the invention.

I claim:

1. A radio frequency identification (RFID) reader for use in an RFID detection system, the reader comprising:
   an RF source for generating RF signals;
   an antenna coupled to the RF source, the antenna detecting communication signals within an interrogation zone received in response to RF signals from an RFID marker within the interrogation zone, the communication signals include Doppler signals indicating movement of the RFID marker within the interrogation zone;
   a receiver for receiving the communication signals from the RFID marker; and
   motion detection circuitry for detecting the Doppler signals,
   wherein the reader operates in a first power mode not suitable for interrogating the RFID marker, and upon detection of incoming Doppler signals the reader switches to a second power mode suitable for interrogating the RFID marker, the second power mode being greater than the first power mode.

2. The reader of claim 1, wherein the motion detection circuitry extracts the Doppler signals from the communication signals.

3. The reader of claim 1, wherein the motion detection circuitry comprises a directional coupler.

4. The reader of claim 1, further comprising a signal processor, wherein the motion detection circuitry is adapted to forward the Doppler signals to the signal processor.

5. The reader of claim 4, wherein the signal processor determines the relative speed of the RFID marker with respect to the reader.

6. The reader of claim 4, wherein the signal processor instructs the antenna to increase power transmitted to the RFID marker if the RFID marker is indicated as being in motion.

7. An RFID detection system comprising:
   one or more RFID markers; and
   an RFID reader comprising:
      an RF source for generating RF signals;
      an antenna coupled to the RF source, the antenna detecting communication signals within an interrogation zone received in response to RF signals from the one or more RFID markers within the interrogation zone, the communication signals include Doppler signals indicating movement of the one or more RFID markers within the interrogation zone;
      a receiver for receiving the communication signals from the one or more RFID markers; and
      motion detection circuitry for detecting the Doppler signals;
   wherein the reader operates in a first power mode not suitable for interrogating the one or more RFID markers, and upon detection of incoming Doppler signals the reader switches to a second power mode suitable for interrogating the one or more RFID markers, the second power mode being greater than the first power mode.

8. The RFID detection system of claim 7, further comprising a signal processor, wherein the signal processor receives the Doppler signals from the motion detection circuitry and determines movement of the one or more RFID markers with respect to the reader.

9. The RFID detection system of claim 8, wherein the signal processor instructs the antenna to increase power transmitted to the one or more RFID markers if the signal processor determines that the one or more RFID markers is in motion.

10. The RFID detection system of claim 7, wherein the motion detection circuitry resides within the RFID reader.

11. The RFID detection system of claim 7, wherein the motion detection circuitry is situated external to, but in communication with, the RFID reader.

12. The RFID detection system of claim 7, wherein the motion detection circuitry comprises a directional coupler.

13. A method of operating an RFID marker reader, the method comprising:
   transmitting a detection signal at a first power level mode not suitable for interrogating an RFID markers, to detect movement of the RFID marker within the interrogating zone; and
   transmitting an interrogation signal at a second power level greater than the first power level to detect the presence of the RFID marker when incoming Doppler signals are detected within the interrogating zone, the interrogation signal being suitable for interrogating the RFID marker.

14. The method of claim 13, further comprising detecting Doppler signals, the Doppler signals being evaluated to determine movement within the interrogation zone.

15. The method of claim 14, wherein movement is determined by evaluating the Doppler signals, the Doppler signals being evaluated by motion detection circuitry included as part of the RFID reader.

16. The method of claim 15, further comprising determining the relative speed of a moving RFID marker with respect to the RFID reader.

17. The method of claim 13, further comprising receiving a communication signal in response to interrogation signal transmitted at the second power level, the communication signal indicating the presence of the RFID marker within the interrogating zone.

* * * * *